United States Patent Office 3,732,321
Patented May 8, 1973

3,732,321
PROCESS FOR MAKING ALPHA-HALOALKENYL-AROMATICS
Charles F. Raley, Midland, Mich., assignor to The Dow Chemical Company, Midland, Mich.
No Drawing. Continuation-in-part of application Ser. No. 691,689, Dec. 19, 1967. This application Mar. 13, 1970, Ser. No. 19,466
Int. Cl. C07c 25/28
U.S. Cl. 260—651 R          1 Claim

ABSTRACT OF THE DISCLOSURE

Alpha-haloalkenylaromatics having the formula

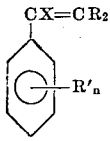

are made by halogenating their corresponding alkenyl-aromatics having the formula

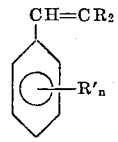

at a temperature between 300° and 700° C. for a time sufficient to produce the alpha-haloalkenylaromatic wherein each R and R′ independently is any group inert under the reaction conditions, X is bromine or chlorine and $n$ is an integer of from 0 to 5 inclusive.

CROSS-REFERENCE TO RELATED APPLICATION

The present application is a continuation-in-part of my previous application Ser. No. 691,689 filed Dec. 19, 1967 and now abandoned.

BACKGROUND OF THE INVENTION

Processes for producing alpha-haloalkenylaromatics are known in the art; see for example C. A. 53, 19950 (1959). These processes are not economically feasible for commercial production because of the low yields of the desired product obtained and/or the necessity of using expensive reagents.

Hoffenberg et al. in U.S. 3,274,077 show that in the chlorination of ar.-methyl styrene the addition of chlorine across the vinyl group predominates over alpha-substitution.

SUMMARY OF THE INVENTION

It has now been found that an alpha-haloalkenyl-aromatic having the formula

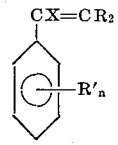

is produced in good yield by contacting in the vapor phase the corresponding alkenylaromatic having the formula

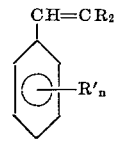

wherein each R and R′ independently is any group inert under the reaction conditions, X is bromine or chlorine and $n$ is an integer of from 0 to 5 inclusive with chlorine or bromine at a temperature of 300° to 700° C. The good yields of alpha halogenation are unexpected because the experience of Hoffenberg et al. would lead to the conclusion that addition would be the predominant reaction if the ar.-methyl group were removed or an inert substituent were put in its place.

The alkenylaromatic reactants may suitably be styrene or a styrene containing any substituent which is inert in the halogenation. Such substituents are unreactive to chlorine or bromine under the conditions of the invention and do not activate other substituents so that they are replaced or halogenated. Representative examples of inert R groups include H, F, perhaloalkyl, t-alkyl, cyano and aryl. Each R independently can be any of these groups provided that when only one R is H, the other R is F, perhaloalkyl or t-alkyl. Examples of R′ substituents which are unreactive to halogen under the reaction conditions include t-alkyl, cyano, bromo, chloro, fluoro, iodo, phenyl, alkoxy and phenoxy. Specific examples of the alkenylaromatic starting materials which are halogenated by the present process include: styrene; beta-perhaloalkylstyrenes, such as beta-mono and diperchloro or perbromomethyl-styrene; beta-t-alkylstyrenes, such as beta-t-butylstyrene, beta-beta-di-t-hexylstyrene; cyanostyrenes, such as beta-perfluoromethyl-beta-cyanostyrene; beta-arylstyrenes, such as beta-fluoro-beta-(p-diphenyl)styrene, beta,beta-diphenylstyrene, beta-phenyl-beta-naphthylstyrene and beta-per-bromopropyl-beta-phenylstyrene; o, m, or p-t-alkylstyrenes, such as p-t-butylstyrene; ar.-halostyrenes, such as m-chlorostyrene, o-fluorostyrene, 2,4,6-tribromostyrene or p-iodostyrene; o, m, or p-cyanostyrenes; o, m, or p-phenylstyrenes; o, m, or p-alkoxystyrenes, such as p-methoxystyrene and m-butoxystyrene; o, m, or p-phenoxystyrenes; and combinations of the above such as beta-t-butyl-2,4,6-tribromostyrene, beta,beta-diphenyl-2-cyano-5-chlorostyrene and p-phenoxy-beta-di-t-amylstyrene. Alkenylaromatics where R′ is fluoro, chloro, bromo and t-butyl are preferred because of their commercial availability, and alkenylaromatics wherein each R is H are also preferred, with styrene being of special interest because of its availability and the high yields of the desired product.

The important reaction condition is the temperature. Good yields of alpha-halogenated alkenylaromatics are obtained at temperatures of about 300° to about 700° C. or higher, with temperatures of 450° to 600° C. being preferred because of the greater efficiency of the reaction. At temperatures below 300° C. a significant amount of halogen addition to the vinyl group limits the usefulness of the reaction, and at temperatures above 700° C. increasing amounts of tar are formed.

The other reaction conditions and techniques of conducting the reaction are not critical to the alpha-halogenation but may be utilized to obtain better product and higher yields.

The reactant ratios may vary widely, but a molar excess of the alkenylaromatic is preferred to prevent over chlorination and the resulting undesirable by-products. A molar ratio of alkenylaromatic to halogen of about 1.5 to about 4 is preferred.

As is common practice in the control of an exothermic reaction, the reactants may be combined with an inert diluent. In this vapor phase reaction any unreactive diluent may be employed, with nitrogen, steam and carbon dioxide being preferred because of their ready availability.

Since the reaction is conducted at temperatures above ambient temperatures, the progress of the reaction is facilitated by preheating the reactants prior to contact, but the reaction can also be conducted by heating the reactants rapidly after contact. Preheating is also useful for limiting the formation of addition by-products.

The reaction is preferably conducted in a continuous process because of the convenience of adjusting the flow rate to give the desired residence time. Although the reaction time may vary widely as different temperatures and conditions are employed, residence times of less than about 5 seconds are usualy employed, with contact times of about 0.1 to about 1 second being preferred under normal operating conditions as described in the specific embodiments.

After the desired contact time, the reaction is preferably terminated abruptly to prevent over halogenation and possible tar formation. This may suitably be accomplished by quenching the reactor effluent with an inert liquid or gas. Any inert quenchant may be employed, with water, nitrogen and carbon dioxide being preferred.

The products of this invention are useful as starting materials and chemical intermediates. For example, U.S. Pat. 3,200,159 describes the preparation of alpha-fluorostyrene starting with alpha-chlorostyrene. The alpha-fluorostyrene can be emulsion-polymerized to a useful homopolymer. Alpha-chlorostyrene is also useful as a starting material for the production of phenylacetylene. Phenylacetylene polymers are excellent stabilizers for polyvinyl chloride, for example see U.S. Pat. 3,098,089.

SPECIFIC EMBODIMENTS

Examples 1–10

Styrene monomer was fed to a preheater and heated to about reaction temperature prior to being diluted with steam. Similarly, bromine or chlorine was preheated and diluted. The diluted streams were then premixed in a 3 mm. I.D. T-tube mixing section, passed through a 2.54 cm. O.D. by 117 cm. standard wall Vycor tube at atmospheric pressure and quickly quenched by a water spray.

The results and reaction conditions are reported in Table I. The yields are based on the styrene converted. ACS and ABS stand for alpha-chlorostyrene and alpha-bromostyrene respectively.

TABLE I.—ALPHA HALOGENATION OF STYRENE

| Example number | Temperature (°C.) | Molar ratios | | | | | Residence time (sec.) | Percent | | |
|---|---|---|---|---|---|---|---|---|---|---|
| | | $H_2O$/styrene | $H_2O$/$Cl_2$ | Styrene/$Cl_2$ | $H_2O$/$Br_2$ | Styrene/$Br_2$ | | Styrene converted | Yield ACS | Yield ABS |
| 1 | 450 | 4.0 | 3.9 | 1.9 | | | 0.27 | 48.2 | 80.6 | |
| 2 | 450 | 4.1 | 4.0 | 2.0 | | | 0.27 | 47.1 | 80.8 | |
| 3 | 500 | 2.0 | 2.0 | 2.8 | | | 0.47 | 28.5 | 83.0 | |
| 4 | 500 | 4.0 | 4.0 | 2.0 | | | 0.25 | 43.4 | 85.0 | |
| 5 | 500 | 3.9 | 3.8 | 2.0 | | | 0.25 | 44.5 | 87.3 | |
| 6 | 550 | 3.7 | 4.7 | 2.3 | | | 0.26 | 37.0 | 84.8 | |
| 7 | 600 | 3.9 | 4.6 | 2.5 | | | 0.25 | 30.5 | 82.6 | |
| 8 | 500 | 4.0 | | | 4.0 | 2.0 | 0.22 | 46.0 | | 72.4 |
| 9 | 600 | 4.0 | | | 4.3 | 2.1 | 0.19 | 35.6 | | 87.1 |
| 10 | 500 | 2.1 | | | 2.0 | 2.9 | 0.42 | 34.5 | | 88.1 |

In the same manner as shown by Examples 1–10, chlorine or bromine may be reacted at temperatures of 300° to 700° C. with beta-fluorostyrene, beta-t-butylstyrene, beta-perchloroethyl-beta-cyanostyrene, beta,beta-diphenylstyrene, o-chlorostyrene, p-fluorostyrene, p-t-butylstyrene, m-cyanostyrene, p-phenylstyrene, p-t-butoxystyrene and p-phenoxystyrene to give the corresponding alpha-halogenated alkenylaromatic.

I claim:

1. A process for making alphahalostyrene, wherein the halo is chloro or bromo, comprising reacting chlorine or bromine with styrene, in the presence of nitrogen, steam or carbon dioxide, at a temperature of 450° to 600° C., at a residence time between 0.1 and 1.0 second, and at a molar ratio of styrene to chlorine or bromine of 1.5 to 4 moles of styrene per mole of chlorine or bromine, and the product is quickly quenched with water.

References Cited

UNITED STATES PATENTS

| | | | |
|---|---|---|---|
| 3,274,077 | 9/1966 | Hoffenberg et al. | 260—651 X |
| 2,130,084 | 9/1938 | Groll et al. | 260—651 X |
| 3,981,758 | 4/-961 | Hoffenberg | 260—651 |

OTHER REFERENCES

Sadykh-Zade, Chem. Abst. 55 22191e, 1961.

HOWARD T. MARS, Primary Examiner

U.S. Cl. X.R.

260—465 G, 611 A, 612 R, 649 F, 649 D, 649 R, 650 R, 650 F, 651 F